United States Patent Office 3,418,156
Patented Dec. 24, 1968

3,418,156
ART OF DECORATING GLASS-CERAMIC
SUBSTRATES
Warren C. Medert, Toledo, and Richard W. Petticrew, Perrysburg, Ohio, assignors to Owens-Illinois, Inc., a corporation of Ohio
No Drawing. Filed May 12, 1965, Ser. No. 455,305
18 Claims. (Cl. 117—124)

ABSTRACT OF THE DISCLOSURE

A high-expansion glaze is applied to a low-expansion glass-ceramic substrate and preferably fired thereon while nucleating and crystallizing the crystallizable glass to form a decorated glass-ceramic body. The glass-ceramic substrate has an average linear coefficient of thermal expansion at 0° to 300° C. of less than about $25 \times 10^{-7}/°$ C. while the coefficient of expansion of the fired glass is about 3 to 4 times that of the glass-ceramic substrate. The glaze does not craze or peel from the substrate and the resultant article is used as decorated cookware.

---

This invention relates broadly to the art of decorating glass-ceramic substrates, e.g., shaped glass-ceramic bodies or articles, and more particularly to the decoration of such substrates with a decorative glaze or enamel. Still more particularly, the invention is concerned with the use of certain high-expansion glazes (inorganic glazes) in decorating low-expansion glass-ceramic substrates. Such glazes or enamels are sometimes designated in the art as "porcelain enamels" or as "ceramic enamels" but herein are most frequently designated as glazes.

In many cases it is desirable for commercial reasons to be able to produce and market a decorated glass-ceramic substrate, e.g., decorated "cookware," which is also sometimes designated as "pressed ware." The decorations may take the form of a single or a plurality of solid colors applied in a particular pattern or design arranged, for example, on the outer or exterior surfaces of the cookware; or the colors may be arranged to form a particular floral or other design such as is commonly used in decorating dinnerware. In other cases the decoration may comprise a trade-mark for the product, a manufacturer's insignia, or various letters, numbers, words, phrases, etc., that are useful in readily identifying the product and/or the manufacturer and/or the place or country of manufacture, as well as to supply various other information. All or part of the outer surface of the cookware or other substrate may be covered with the applied decorative coating, as desired or as may be required by commercial and economical considerations.

The ordinary high-expansion glazes normally cannot be fired onto low-expansion glass-ceramic bodies or structures without severe crazing; and, usually, such glazes peel, or are easily peelable from, the body or article to which they have been initially applied by conventional techniques, e.g., in the form of a decal, and then fired.

The present invention is based on our discovery that certain compositions capable of forming glazes when a thin coating thereof is fired (matured) on a substrate, are useful in decorating low-expansion glass-ceramic substrates. The "glazes" (within which term are included potential glazes) or compositions employed in practicing this invention can be applied in various ways and at various stages of manufacture to yield, after firing at a high temperature, a decorated substrate wherein the applied decoration adheres to the glass-ceramic body without objectionable crazing or peeling.

As a result of this discovery the invention provides a low-expansion, decorated, glass-ceramic substrate having at least a portion of its surface decorated with a glaze which, before it has been fired on the said substrate (or precursor thereof), is a glaze of the kind hereafter described. Preferably the glass-ceramic substrate is one that has an average lineal coefficient of thermal expansion, over the range from 0° C. to 300° C., less than $25 \times 10^{-7}/°$ C. and, more preferably, at or less than about $20 \times 10^{-7}/°$ C., i.e., not higher than about $20 \times 10^{-7}/°$ C. The substrate may be in the form of a shaped glass-ceramic structure or article, e.g., cookware.

We are unable to state with certainty the reasons why it is possible for a high-expansion decorative glaze to be applied to a low-expansion glass-ceramic body. One possible explanation is that during the firing operation, which is materially higher than that normally employed in maturing such a glaze, a diffusion action takes place between the applied glaze and the shaped crystallizable glass substrate. In other words, a coaction takes place between the glaze and the substrate, resulting in an increase in crystallinity at least at the borderline or interface between the two. As a result, the fired glaze tenaciously adheres to the substrate. This is probably due to the fact that, in effect, a graded seal or bond is obtained between the contacting surfaces.

Composition of the glaze

The glazes used in practicing this invention may be broadly described as being compositions which, before being fired (matured), are comprised essentially of the following components that are present in the following approximate weight percent ranges:

| | |
|---|---|
| PbO | 35–60 |
| $SiO_2$ | 7.5–30 |
| $Cr_2O_3$ | 0.2–19 |
| $B_2O_3$ | 3–12 |
| $Al_2O_3$ | 0.3–7 |

More specifically, the glazes may be described as compositions which, before being fired, comprise or consist of the following components that are present in the following approximate weight percent ranges:

| | |
|---|---|
| PbO | 35–60 |
| $SiO_2$ | 7.5–30 |
| $Cr_2O_3$ | 0.2–19 |
| $B_2O_3$ | 3–12 |
| $Al_2O_3$ | 0.3–7 |
| $ZrO_2$ | 0–16 |
| $TiO_2$ | 0–12 |
| CdO | 0–7.5 |
| CuO | 0–5 |
| ZnO | 0–4.5 |
| CoO | 0–4.5 |
| MgO | 0–3.5 |
| $Na_2O$ | 0–2.5 |
| $Fe_2O_3$ | 0–2.5 |
| BaO | 0–1.6 |
| $SnO_2$ | 0–1.5 |
| $K_2O$ | 0–1 |
| NiO | 0–0.8 |
| MnO | 0–0.8 |
| $Li_2O$ | 0–0.5 |
| $V_2O_5$ | 0–0.3 |
| $MoO_3$ | 0–0.3 |
| CaO | 0–0.3 |

In lieu of, or in addition to, any one or more of the foregoing minor additives or coloring agents, there may be used (as desired or as may be required in order to obtain a particular effect) one or more other additives or coloring agents such as, for instance, one or more of the noble metals, e.g., gold, silver, platinum, rhodium, palladium, etc., and which are introduced into the glaze composition in conventional form or manner.

In Table I are given the results of analyses of five (5) different glazes within the aforemtioned weight percent ranges of components of the glaze and which are useful in practicing the invention. That such glazes could be used in decorating a low-expansion, glass-ceramic substrate was wholly unobvious and unexpected, since the lineal expansion coefficient of the fired glaze or enamel is three or four times as much as that of the glass-ceramic substrate. In the heading of the table wherein each sample is identified, the color of the fired glaze is also given.

TABLE I.—ANALYSES OF FIVE GLAZE SPECIMENS

| Components | A<br>Dark brown | B<br>Beige | C<br>Light green | D<br>Tan | E<br>Dark green-blue |
|---|---|---|---|---|---|
| $SiO_2$ | 8.5 | 25.0 | 25.1 | 27.1 | 16.5 |
| $B_2O_3$ | 8.5 | 10.8 | 3.6 | 3.4 | 10.5 |
| $Al_2O_3$ | [1] 1.95 | 6.0 | 0.5 | 0.4 | 5.2 |
| $Fe_2O_3$ | [2] 2.16 | [8] 1.24 | | | |
| $Cr_2O_3$ | [3] 1.22 | [6] 0.22 | 12.3 | 8.0 | 17.2 |
| $TiO_2$ | 11.0 | [6] 0.19 | 4.7 | 1.1 | |
| $ZrO_2$ | | 14.5 | 2.8 | 1.5 | |
| $V_2O_5$ | | [6] 0.19 | | | |
| $SnO_2$ | | [7] 1.31 | | | |
| PbO | 54.3 | 39.1 | 44.9 | 48.5 | 38.8 |
| $MoO_3$ | | 0.20 | | | |
| ZnO | [4] 3.91 | | | | 2.6 |
| CdO | 6.7 | | | | |
| CoO | 0.40 | [6] 0.18 | 1.2 | | 4.1 |
| NiO | | [8] 0.73 | | | |
| BaO | [5] 1.03 | | 0.7 | 1.4 | |
| $Li_2O$ | | 0.40 | | | 0.4 |
| CuO | | | | 4.6 | |
| MnO | | | | 0.7 | |
| $Na_2O$ | | | 3.1 | 2.6 | 0.1 |
| $K_2O$ | | | 0.1 | 0.1 | 0.8 |
| CaO | | | | | 0.2 |
| MgO | | | | | 2.8 |

[1] I.e., ca. 2.0.
[2] I.e., ca. 2.2.
[3] I.e., ca. 1.2.
[4] I.e., ca. 3.9.
[5] I.e., ca. 1.0.
[6] I.e., ca. 0.2.
[7] I.e., ca. 1.3.
[8] I.e., ca. 0.7.

In table II there is given a summary of the analyses of the five glaze specimens identified in Table I.

TABLE II.—SUMMARY OF ANALYSES OF GLAZE SPECIMENS

| Components as oxides | Wt. percent range | No. of samples in which oxide is present |
|---|---|---|
| $SiO_2$ | 8.5–27.1 | 5 |
| $B_2O_3$ | 3.–10.88 | 5 |
| PbO | 38.8–54.3 | 5 |
| $Al_2O_3$ | 0.4–6.0 | 5 |
| $Cr_2O_3$ | 0.22–17.2 | 5 |
| $TiO_2$ | 0.19–11.0 | 4 |
| CoO | 0.18–4.1 | 4 |
| $ZrO_2$ | 1.5–14.5 | 3 |
| BaO | 0.7–1.4 | 3 |
| $Na_2O$ | 0.1–3.1 | 3 |
| $K_2O$ | 0.1–0.8 | 3 |
| $Fe_2O_3$ | 1.24–2.16 | 2 |
| $Li_2O$ | 0.4 | 2 |
| ZnO | 2.6–3.91 | 2 |
| $V_2O_5$ | 0.19 | 1 |
| $SnO_2$ | 1.31 | 1 |
| $MoO_3$ | 0.2 | 1 |
| CdO | 6.7 | 1 |
| NiO | 0.73 | 1 |
| CuO | 4.6 | 1 |
| MnO | 0.7 | 1 |
| CaO | 0.2 | 1 |
| MgO | 2.8 | 1 |

Other examples of glazes that have been tested and found ot be useful in practicing this invention are listed below by their manufacturer's identification number:

Name and address of manufacturer or supplier:     Identification number

Ferro Corporation
4150 East 56th Street
Cleveland, Ohio
- 45-Y-1
- 50-N-3
- 75-A-1
- 42-C-1
- 54-C-1
- 1604-B
- 1604-B+15% 2121
- 40-B-3
- 3906-E Harshaw Chemical Company
1945 East 97th Street
Cleveland, Ohio
- E-433
- E-431
- E-432
- E-430
- E-434
- E-429
- E-428
- E-427
- HL-434
- J-701
- BK-36
- E-399
- G-455
- P-7
- L-560
- FK-3
- J-404 BE
- BK-49
- TE-204+15% M5

B. F. Drakenfeld & Company, Inc.
Washington, Pa.
Main office at
51-53 Park Place
New York 7, N.Y.
- 29-771
- 29-772
- 27-1511
- 24-741
- 23-965
- 27-1466
- 24-513
- [1] 1220
- 973
- B26-777

Hanovia Liquid Gold Division
Engelhard Industries, Inc.
1 West Central Avenue
East Newark, N.J.
- 1820-D
- 8272
- 8466
- 6766
- 7449
- 7840

[1] Cornflower blue.

The glass-ceramic substrate

Glass-ceramic substrates, e.g., shaped glass-ceramic structures or articles, having a low-expansion coefficient (i.e., a low average coefficient of lineal thermal expansion) are made by the controlled crystallization of crystallizable glass compositions or bodies. Such articles (e.g., cookware), compositions used in their manufacture, and method features are known (see, for example, U.S. Patents 2,960,801 and 2,960,802 dated Nov. 22, 1960; also, an article entitled "Glass," Chemical and Engineering News, Nov. 16, 1964, pp. 80–96, especially pp. 89, 90 and 96, for additional information on glass-ceramics, their properties and uses). Reference is also made to the compositions and bodies or articles comprised of crystalline ceramics (glass-ceramics) that are produced as described in Smith copending application Ser. No. 352,958, filed Mar. 18, 1964 now U.S. Patent 3,380,818, and in Babcock et al. copending application Ser. No. 386,693, filed July 31, 1964, both of which applications are assigned to the same assignee as the present invention. By this cross-reference, the disclosures of both of these copending applications are made a part of the disclosure of the instant application.

The present invention is particularly applicable in decorating substrates produced by in-situ crystallization of crystallizable glass compositions of the kind broadly and specifically set forth in the aforementioned copending applications of Smith and of Babcock et al. These preferred glass compositions have a liquidus temperature below 2460° F. and a composition consisting essentially of the following components, present in the following weight percent ranges:

| | |
|---|---|
| $SiO_2$ | 66–73 |
| $Al_2O_3$ | 15–19 |
| $Li_2O$ | 2.5–4 |
| MgO | 3–7.7 |

| | |
|---|---|
| $ZrO_2$ | 1–1.7 |
| $TiO_2$ | 1–<1.9 |
| $SnO_2$ | 0–1.7 |
| $P_2O_5$ | 0–3 |
| BaO | 0–5 |
| ZnO | 0–3 | where the total weight percent of $$ZrO_2 + TiO_2 + SnO_2 + P_2O_5$$

is at least 2.8, and the total weight percent of $Li_2O + MgO$ is up to 10.5, more particularly from 6.3 to 10.5.

A more preferred glass composition (i.e., thermally crystallizable glass) within the broader ranges set forth above is one consisting essentially of the following components, which are present in the following weight percentage ranges:

| | |
|---|---|
| $SiO_2$ | 68–72 |
| $Al_2O_3$ | 16–18 |
| $Li_2O$ | 2.8–3.8 |
| MgO | 3–5 |
| $ZrO_2$ | 1.2–1.5 |
| $TiO_2$ | 1.2–<1.9 |
| $SnO_2$ | 0–1.5 |
| $P_2O_5$ | ¹ 0–2 |
| BaO | 0–3 |

¹ Preferably from 0.5–2.

Such a glass composition also may contain, if desired, 1.9–<2.4 weight percent of $TiO_2$.

The invention is applicable in decorating glass-ceramic substrates made by thermal crystallization in-situ of a crystallizable glass containing as essential components lithia, alumina and silica, together with sufficient nucleating agent to promote crystallization, thereby to yield a glass-ceramic having an average lineal coefficient of thermal expansion, over the range from 0°–300° C., less than $25 \times 10^{-7}/°$ C., more particularly less than $20 \times 10^{-7}/°$ C., and no more than 60% of the expansion coefficient of said glass before said crystallization in-situ.

It is believed that the glass-ceramic materials or structures, made by thermal in-situ crystallization of crystallizable glasses embraced by the above formulations, contain or have as predominant in-situ-formed crystalline species lithium-containing crystals in the form of beta-eucryptite or beta-eucryptite-like crystals, or beta-spodumene or beta-spodumene-like crystals or both, said ceramics containing a multitude of such crystalline species in random orientation throughout said ceramic and dispersed in a glassy matrix remaining as a result of the in-situ crystallization, and substantially all the crystals of said ceramic having a diameter of less than 25 microns.

In the compositions embraced by the foregoing description, a number of nucleating agents can be employed. For instance, $TiO_2$, $ZrO_2$, $SnO_2$, and $P_2O_5$ can be used alone or in combination with each other, where the total amount of one or more of such nucleating agents employed is between 2 and 10 weight percent of the total glass composition. Also, $Cr_2O_3$ can be used as a nucleating agent in amounts of about 0.2 weight percent or less, together with about 1–10 weight percent of any of the nucleating agents previously mentioned.

A particularly useful range of glasses and glass-ceramics within the scope of the foregoing description, and to which the present invention is applicable, are those containing 50–75 weight percent $SiO_2$, 16–35 weight percent $Al_2O_3$ and from 2.5–6 weight percent $Li_2O$, based on the total glass composition, as well as the amount of nucleating agent found to be necessary to promote the formation of the small crystals.

The terms beta-eucryptite crystals and beta-eucryptite-like crystals are herein used alternatively and in a generic sense. Thus, while beta-eucryptite is often thought of as the species crystal having one mole of lithium, one mole of aluminum and two moles of silicon, both terms are used in this application to designate crystalline species having the beta-eucryptite structure, as shown by X-ray diffraction, but the peaks can be shifted slightly depending upon whether there is a definite amount of silica present other than exactly two moles, either more or less silica than the two moles. Similarly, the terms beta-spodumene crystals and beta-spodumene-like crystals are herein used alternatively and in a generic sense, specifying crystalline species that have the crystalline structure of beta-spodumene that contains four moles of silica to one of alumina and one of lithia, but with the peaks shifted somewhat when the crystalline structure contains more or less than four moles of silica. Thus, as employed herein, the terms beta-eucryptite and beta-spodumene are each used in this generic sense.

From formulations and descriptions such as those given above by way of example, and these and other formulations and descriptions appearing in the aforementioned copending applications of Smith and of Babcock et al., there can be produced glass-ceramic substrates, e.g., shaped glass-ceramic articles or structures; and, more particularly, shaped, non-porous (substantially non-porous), at least partly crystalline receptacles or containers having the previously described average lineal coefficient of thermal expansion and containing a multitude of substantially homogeneously dispersed crystals, essentially all of which crystals are in their largest lineal dimension less than 25 microns across. These glass-ceramic substrates or precursors thereof, e.g., a shaped crystallizable glass before being subjected to nucleation and crystallization can be decorated in accordance with the present invention.

*The overall process including the decorating technique*

A typical general procedure in making non-decorated glass-ceramic substrates, e.g., articles such as cookware, is outlined below:

(1) Melting and refining
(2) Glass conditioning and gob feeding
(3) Gob fed to mold
(4) Pressed
(5) Article cooled with blast of gaseous coolant
(6) Removed from mold
(7) Fire polished
(8) Annealed
(9) Nucleated and crystallized.

The decorative step involved in this invention may be introduced into the overall procedure at any convenient stage in the process after the article has been removed from the mold; and, more particularly, after the fire-polishing step if the latter is employed in the overall process. Thus, the decorative step may be introduced after fire polishing and before annealing; during the annealing procedure; after annealing and before nucleation and crystallization; or after nucleation and crystallization. Preferably the decorative step is introduced into the overall process after annealing and before nucleation and crystallization.

*The decorative step*

Any of the conventional techniques for physically applying an inorganic decorative material to an inorganic substrate may be employed. One such method involves the use of a decal. The decal is prepared using the commercially available materials known as decal paper, decal medium for dispersing the ceramic glass enamel or glaze of the kind used in this invention, and decal cover coat. Generally, the ceramic-glass-enamel thickness of the decoration deposited on the decal paper and subsequently on the inorganic substrate varies from about 10 to about 14 microns. Depending upon various influencing factors such as, for example, the composition of the decorating material, a thinner or thicker coating may be applied.

Various other decorating methods can be used by dispersing the decorative enamel or glaze in commercially available media suitable for such application techniques as (a) spraying; (b) stencil-screen application; and (c) brushing. Thus, when the decorative enamel is to be sprayed on the substrate it may be dispersed in, for example, a water-alcohol mixture to form a sprayable composition.

For additional and more detailed information on techniques that can be used in applying the decorative glazes used in practicing this invention, see the reference books and publications in this field such as, for example, "Ceramic Glazes," by Cullen W. Parmalee, Second Edition (1951), published by Industrial Publications, Inc.; and "Porcelain Enamels, the Preparation, Application and Properties of Enamels," by Andrew I. Andrews, Second Edition (1961), published by The Garrard Press, Champaign, Ill.

As stated hereinbefore, the decorative step is preferably introduced into the overall process after the shaped structure has been annealed but before nucleation and crystallization thereof.

In general, essentially the same temperature conditions employed in effecting nucleation and crystallization of an undecorated shaped structure or wave formed of crystallizable glass, and which is sometimes designated as "green" ware, can be used in simultaneously firing the applied decorative glaze composition and at least partly crystallizing the said structure to form a decorated glass-ceramic body. These temperatures may vary widely depending, for example, upon the compositions of the particular crystallizable glasses and decorative glazes employed, the particular physical properties desired in the glass-ceramic substrate, and other influencing factors.

When the preferred glass compositions disclosed in the aforementioned copending applications of Smith and of Babcock et al. are employed, generally the annealed ware is heated first at a low temperature to form many nuclei or crystallities, and thereafter at a higher temperature to complete crystallization to the desired degree. The optimum heat-treatment depends, for instance, upon the particular glass composition, the ratios of its ingredients, the type and amount of its nucleants, as well as upon the properties desired in the final product. Therefore, it is not possible to specify a heat-treating schedule that will be common to all useful crystallizable glasses. However, it is ordinarily preferred that the aforementioned low-temperature heat-treatment be in the region of maximum or high rate of nuclei or crystallite formation, wherein "nuclei" are defined as submicroscopic precursors of crystalline species or as a finely dispersed submicroscopic immiscible glassy phase. The optimum temperature of this initial heat treatment seems to lie in the range from the annealing point of the glass to about 250° F. above its annealing point.

The following schedule for effecting nucleation and for firing the applied glaze composition is applicable when a crystallizable glass is used having, for example, the following approximate composition: 70.7% $SiO_2$, 16.8% $Al_2O_3$, 3.4% $Li_2O$, 1.8% $TiO_2$, 1.3% $ZrO_2$, 3.9% $MgO$, 1.4% $P_2O_5$, 0.5% $Na_2O$, 0.1% $As_2O_3$, and 0.09% F. The shaped or formed glass is cooled, e.g., to below its annealing-point temperature; the decorative glaze composition is applied, e.g., one of those described in Table I; and the resulting article is thereafter heat-treated as follows:

*Heat-treatment schedule*

Heated from 1100 to 1200° F. at a rate of 145°/hr.
Heated from 1200 to 1300° F. at a rate of 25°/hr.
Heated from 1300 to 1600° F. at a rate of 50°/hr.
Heated from 1600 to 1950° F. at a rate of 145°/hr.
Held at 1950° F. for one hour.
Cooled at a rate of about 400° F./hr.

The heat-treated articles, e.g., in the form of rods, are white (except in the decorated portions thereof), very fine-grained, glossy and strong. Specifically, the modulus of rupture of the abraded rods tested is 19,000 p.s.i., and they withstand thermal shock when plunged into water at about 1300° F. temperature differential. Thus, the rods are at about 1380° F. while the water is at about 80° F. or less. The measured average coefficient of lineal thermal expansion of the rods is about $14 \times 10^{-7}$ between 26° and 694° C.

In the decorated glass-ceramic articles produced as above described, the fired or matured decorative enamel or glaze neither peeled from the substrate nor was any crazing observable by the naked eye.

As indicated hereinbefore, the temperature of firing the applied decorative glaze may range, for example, from or below the annealing point of the glass (or through the annealing temperature range) to the maximum temperature employed in effecting nucleation and crystallization of the shaped crystallizable glass, whereby there is obtained a glass-ceramic article having a fired or matured decorative glaze thereon. Thus, the temperature of simultaneously firing the applied glaze and nucleating and crystallizing the crystallizable glass may range from, for instance, about 1000°–1200° F. in the initial stage to a maximum of about 1900°–2000° F. or higher, depending upon, for example, the compositions of the particular crystallizable glass and decorative glazes employed, the physical properties desired in the final product, and other influencing factors. For additional and more detailed information on the temperatures that may be used in effecting nucleation and crystallization of a crystallizable glass to yield a glass-ceramic article, which temperatures are operative in simultaneously firing the applied decorative glaze in practicing this invention, reference is made to the aforementioned copending applications of Smith and of Babcock et al.

As will be evident to those skilled in the art, modifications of this invention can be made or followed in the light of the foregoing disclosure without departing from the spirit and scope of the disclosure or from the scope of the claims.

We claim:

1. A low-expansion, decorated, glass-ceramic substrate having at least a portion of its surface decorated with a glaze which, before being fired, is a composition comprised essentially of the following components, present in the following approximate weight percent ranges:

| | |
|---|---|
| PbO | 35–60 |
| $SiO_2$ | 7.5–30 |
| $Cr_2O_3$ | 0.2–19 |
| $B_2O_3$ | 3–12 |
| $Al_2O_3$ | 0.3–7 | the fired glaze having an average linear coefficient of thermal expansion that is at least 3 times as much as the average lineal coefficient of thermal expansion of the fired glass-ceramic substrate.

2. A decorated, glass-ceramic substrate as in claim 1 that has an average lineal coefficient of thermal expansion, over the range from 0° to 300° C., less than $25 \times 10^{-7}/°$ C.

3. A shaped, low-expansion, glass-ceramic structure having at least a portion of its surface decorated with a glaze which, before being fired, is a composition consisting of the following components, present in the following approximate weight percent ranges:

| | |
|---|---|
| PbO | 35–60 |
| $SiO_2$ | 7.5–30 |
| $Cr_2O_3$ | 0.2–19 |
| $B_2O_3$ | 3–12 |
| $Al_2O_3$ | 0.3–7 |
| $ZrO_2$ | 0–16 |
| $TiO_2$ | 0–12 |
| CdO | 0–7.5 |

| | |
|---|---|
| CuO | 0–5 |
| ZnO | 0–4.5 |
| CoO | 0–4.5 |
| MgO | 0–3.5 |
| $Na_2O$ | 0–2.5 |
| $Fe_2O_3$ | 0–2.5 |
| BaO | 0–1.6 |
| $SnO_2$ | 0–1.5 |
| $K_2O$ | 0–1 |
| NiO | 0–0.8 |
| MnO | 0–0.8 |
| $Li_2O$ | 0–0.5 |
| $V_2O_5$ | 0–0.3 |
| $MoO_3$ | 0–0.3 |
| CaO | 0–0.3 | said shaped, glass-ceramic structure being formed from a preformed glass structure by thermal in-situ crystallization, having a multitude of substantially homogeneously dispersed crystals, essentially all of which crystals are in their largest lineal dimension less than 25 microns across, having an average coefficient of lineal thermal expansion less than $25 \times 10^{-7}/°$ C. over the range from 0° to 300° C., and no more than 60% of the expansion coefficient of the said preformed glass structure before said in-situ crystallization, the fired glaze having an average lineal co-efficient of thermal expansion of about 3 to 4 times as much as that of the glass-ceramic structure.

4. A shaped, non-porous, glass-ceramic receptacle having a multitude of substantially homogeneously dispersed crystals, essentially all of which crystals are in their largest lineal dimension less than 25 microns across, said ceramic receptacle having been formed from a preformed glass receptacle by thermal in-situ crystallization, said glass being a thermally crystallizable glass having a liquidus temperature below 2460° F. and a composition consisting essentially of the following components, present in the following weight percent ranges:

| | |
|---|---|
| $SiO_2$ | 66–73 |
| $Al_2O_3$ | 15–19 |
| $Li_2O$ | 2.5–4 |
| MgO | 3–7.7 |
| $ZrO_2$ | 1–1.7 |
| $TiO_2$ | 1–<1.9 |
| $SnO_2$ | 0–1.7 |
| $P_2O_5$ | 0–3 |
| BaO | 0–5 |
| ZnO | 0–3 | where the total weight percent of

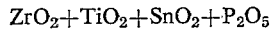
$ZrO_2+TiO_2+SnO_2+P_2O_5$ is at least 2.8, and the total weight percent $Li_2O+MgO$ is up to 10.5, said glass-ceramic receptacle having an average coefficient of thermal expansion less than $25 \times 10^{-7}/°$ C. over the range from 0° to 300° C. and no more than 60% of the expansion coefficient of said glass before said in-situ crystallization, said glass-ceramic receptacle having at least a portion of its surface decorated with a glaze which, before being fired, is a composition comprised essentially of the following components, present in the following approximate weight percent ranges:

| | |
|---|---|
| PbO | 35–60 |
| $SiO_2$ | 7.5–30 |
| $Cr_2O_3$ | 0.2–19 |
| $B_2O_3$ | 3–12 |
| $Al_2O_3$ | 0.3–7 | the fired glaze having an average coefficient of thermal expansion of about 3 to 4 times as much as that of the glass-ceramic receptacle.

5. A shaped, non-porous, glass-ceramic receptacle as in claim 4 and which has at least a portion of its surface decorated with a glaze which, before being fired, is a composition consisting of the following components, present in the following weight percent ranges:

| | |
|---|---|
| PbO | 35–60 |
| $SiO_2$ | 7.5–30 |
| $Cr_2O_3$ | 0.2–19 |
| $B_2O_3$ | 3–12 |
| $Al_2O_3$ | 0.3–7 |
| $ZrO_2$ | 0–16 |
| $TiO_2$ | 0–12 |
| CdO | 0–7.5 |
| CuO | 0–5 |
| ZnO | 0–4.5 |
| CoO | 0–4.5 |
| MgO | 0–3.5 |
| $Na_2O$ | 0–2.5 |
| $Fe_2O_3$ | 0–2.5 |
| BaO | 0–1.6 |
| $SnO_2$ | 0–1.5 |
| $K_2O$ | 0–1 |
| NiO | 0–0.8 |
| MnO | 0–0.8 |
| $Li_2O$ | 0–0.5 |
| $V_2O_5$ | 0–0.3 |
| $MoO_3$ | 0–0.3 |
| CaO | 0–0.3 |

6. A shaped, non-porous, glass-ceramic receptacle as in claim 4 wherein the thermally crystallizable glass has a liquidus temperature below 2460° F. and a composition consisting essentially of the following components, present in the following weight percent ranges:

| | |
|---|---|
| $SiO_2$ | 68–72 |
| $Al_2O_3$ | 16–18 |
| $Li_2O$ | 2.8–3.8 |
| MgO | 3–5 |
| $ZrO_2$ | 1.2–1.5 |
| $TiO_2$ | 1.2–<1.9 |
| $SnO_2$ | 0–1.5 |
| $P_2O_5$ | 0–2 |
| BaO | 0–3 |

7. A shaped, non-porous, glass-ceramic receptacle as in claim 6 wherein the weight percent range of $P_2O_5$ in the thermally crystallizable glass composition is from 0.5 to 2.

8. Glass-ceramic cookware having a multitude of substantially homogeneously dispersed crystals, essentially all of which crystals are in their largest lineal dimension less than 25 microns across, said glass ceramic cookware having been formed from preformed glass cookware by thermal in-situ crystallization, said glass having a liquidus temperature below 2460° F. and a composition consisting essentially of the following components, present in the following weight percent ranges:

| | |
|---|---|
| $SiO_2$ | 68–72 |
| $Al_2O_3$ | 16–18 |
| $Li_2O$ | 2.8–3.8 |
| MgO | 3–5 |
| $ZrO_2$ | 1.2–1.5 |
| $TiO_2$ | 1.2–<1.9 |
| $SnO_2$ | 0–1.5 |
| $P_2O_5$ | 0–2 |
| BaO | 0–3 | said glass-ceramic cookware having an average coefficient of lineal thermal expansion less than $20 \times 10^{-7}/°$ C. over the range from 0° to 300° C., and said cookware having at least a portion of its surface decorated with a glaze which, before being fired, is a composition consisting of the following components, present in the following approximate weight percent ranges:

| | |
|---|---|
| PbO | 35–60 |
| $SiO_2$ | 7.5–30 |
| $Cr_2O_3$ | 0.2–19 |
| $B_2O_3$ | 3–12 |

| | |
|---|---|
| $Al_2O_3$ | 0.3–7 |
| $ZrO_2$ | 0–16 |
| $TiO_2$ | 0–12 |
| CdO | 0–7.5 |
| CuO | 0–5 |
| ZnO | 0–4.5 |
| CoO | 0–4.5 |
| MgO | 0–3.5 |
| $Na_2O$ | 0–2.5 |
| $Fe_2O_3$ | 0–2.5 |
| BaO | 0–1.6 |
| $SnO_2$ | 0–1.5 |
| $K_2O$ | 0–1 |
| NiO | 0–0.8 |
| MnO | 0–0.8 |
| $Li_2O$ | 0–0.5 |
| $V_2O_5$ | 0–0.3 |
| $MoO_3$ | 0–0.3 |
| CaO | 0–0.3 | the fired glaze having an average coefficient of linear thermal expansion of about 3 to 4 times as much as that of the glass-ceramic cookware.

9. A low-expansion, decorated, glass-ceramic substrate having at least a portion of its surface decorated with a glaze which, before being fired, is a composition comprised essentially of the following components, present in the following approximate weight percents:

| | |
|---|---|
| $SiO_2$ | 8.5 |
| $B_2O_3$ | 8.5 |
| $Al_2O_3$ | 2.0 |
| $Fe_2O_3$ | 2.2 |
| $Cr_2O_3$ | 1.2 |
| $TiO_2$ | 11.0 |
| PbO | 54.3 |
| ZnO | 3.9 |
| CdO | 6.7 |
| CoO | 0.4 |
| BaO | 1.0 | the glass-ceramic substrate having an average lineal coefficient of thermal expansion, over the range from 0° to 300° C., of less than $25 \times 10^{-7}/°$ C., the fired glaze having an average linear coefficient of thermal expansion of about 3 to 4 times as much as that of the glass-ceramic substrate.

10. A low-expansion, decorated, glass-ceramic substrate having at least a portion of its surface decorated with a glaze which, before being fired, is a composition comprised essentially of the following components, present in the following approximate weight percents:

| | |
|---|---|
| $SiO_2$ | 25.0 |
| $B_2O_3$ | 10.8 |
| $Al_2O_3$ | 6.0 |
| $Fe_2O_3$ | 1.2 |
| $Cr_2O_3$ | 0.2 |
| $TiO_2$ | 0.2 |
| $ZrO_2$ | 14.5 |
| $V_2O_5$ | 0.2 |
| $SnO_2$ | 1.3 |
| PbO | 39.1 |
| $MoO_3$ | 0.2 |
| CoO | 0.2 |
| NiO | 0.7 |
| $Li_2O$ | 0.4 | the glass-ceramic substrate having an average lineal coefficient of thermal expansion, over the range from 0° to 300° C., of less than $25 \times 10^{-7}/°$ C., the fired glaze having an average linear coefficient of thermal expansion of about 3 to 4 times as much as that of the glass-ceramic substrate.

11. A low-expansion, decorated, glass-ceramic substrate having at least a portion of its surface decorated with a glaze which, before being fired, is a composition comprised essentially of the following components, present in the following approximate weight percents:

| | |
|---|---|
| $SiO_2$ | 25.1 |
| $B_2O_3$ | 3.6 |
| $Al_2O_3$ | 0.5 |
| $Cr_2O_3$ | 12.3 |
| $TiO_2$ | 4.7 |
| $ZrO_2$ | 2.8 |
| PbO | 44.9 |
| CoO | 1.2 |
| BaO | 0.7 |
| $Na_2O$ | 3.1 |
| $K_2O$ | 0.1 | the glass-ceramic substrate having an average lineal coefficient of thermal expansion, over the range from 0° to 300° C., of less than $25 \times 10^{-7}/°$ C., the fired glaze having an average linear coefficient of thermal expansion of about 3 to 4 times as much as that of the glass-ceramic substrate.

12. A low-expansion, decorated, glass-ceramic substrate having at least a portion of its surface decorated with a glaze which, before being fired, is a composition comprised essentially of the following components, present in the following approximate weight percents:

| | |
|---|---|
| $SiO_2$ | 27.1 |
| $B_2O_3$ | 3.4 |
| $Al_2O_3$ | 0.4 |
| $Cr_2O_3$ | 8.0 |
| $TiO_2$ | 1.1 |
| $ZrO_2$ | 1.5 |
| BbO | 48.5 |
| BaO | 1.4 |
| CuO | 4.6 |
| MnO | 0.7 |
| $Na_2O$ | 2.6 |
| $K_2O$ | 0.1 | the glass-ceramic substrate having an average lineal coefficient of thermal expansion, over the range from 0° to 300° C., of less than $25 \times 10^{-7}/°$ C., the fired glaze having an average linear coefficient of thermal expansion of about 3 to 4 times as much as that of the glass-ceramic substrate.

13. A low-expansion, decorated, glass-ceramic substrate having at least a portion of its surface decorated with a glaze which, before being fired, is a composition comprised essentially of the following components, present in the following approximate weight percents:

| | |
|---|---|
| $SiO_2$ | 16.5 |
| $B_2O_3$ | 10.5 |
| $Al_2O_3$ | 5.2 |
| $Cr_2O_3$ | 17.2 |
| PbO | 38.8 |
| ZnO | 2.6 |
| CoO | 4.1 |
| $Li_2O$ | 0.4 |
| $Na_2O$ | 0.1 |
| $K_2O$ | 0.8 |
| CaO | 0.2 |
| MgO | 2.8 | the glass-ceramic substrate having an average lineal coefficient of thermal expansion, over the range from 0° to 300° C., of less than $25 \times 10^{-7}/°$ C., the fired glaze having an average linear coefficient of thermal expansion of about 3 to 4 times as much as that of the glass-ceramic substrate.

14. The method of decorating a low-expansion, glass-ceramic substrate which comprises:

(A) applying to at least a portion of the crystallizable glass substrate, from which said low-expansion glass-ceramic substrate is made by thermal in-situ crystallization, a decorative glaze which, before being fired, is a composition comprised essentially of the following components, present in the following approximate weight percent ranges:

| | |
|---|---|
| PbO | 35–60 |
| $SiO_2$ | 7.5–30 |
| $Cr_2O_3$ | 0.2–19 |
| $B_2O_3$ | 3–12 |
| $Al_2O_3$ | 0.3–7 | the glaze when fired having an average lineal coefficient of thermal expansion that is about 3 to 4 times as much as that of the substrate when crystallized to form a glass-ceramic; and (B) heating at about 1000° F. to about 2000° F. said crystallizable glass substate with its applied decorative glaze thereon under temperature conditions effective in both maturing the applied glaze and in partly crystallizing the crystallizable glass substrate to a decorated glass-ceramic substrate.

15. The method of decorating a shaped low-expansion glass-ceramic structure which comprises:

(A) applying to at least a portion of the shaped crystallizable glass structure, from which the said glass-ceramic structure is made by in-situ crystallization, a decorative glaze which, before being fired, is a composition consisting of the following components, present in the following approximate weight percent ranges:

| | |
|---|---|
| PbO | 35–60 |
| $SiO_2$ | 7.5–30 |
| $Cr_2O_3$ | 0.2–19 |
| $B_2O_3$ | 3–12 |
| $Al_2O_3$ | 0.3–7 |
| $ZrO_2$ | 0–16 |
| $TiO_2$ | 0–12 |
| CdO | 0–7.5 |
| CuO | 0–5 |
| ZnO | 0–4.5 |
| CoO | 0–4.5 |
| MgO | 0–3.5 |
| $Na_2O$ | 0–2.5 |
| $Fe_2O_3$ | 0–2.5 |
| BaO | 0–1.6 |
| $SnO_2$ | 0–1.5 |
| $K_2O$ | 0–1 |
| NiO | 0–0.8 |
| MnO | 0–0.8 |
| $Li_2O$ | 0–0.5 |
| $V_2O_5$ | 0–0.3 |
| $MoO_3$ | 0–0.3 |
| CaO | 0–0.3 | said decorative glass having been applied to at least a portion of the shaped crystallization glass structure after it has been annealed but before it has been subjected to controlled heating to effect nucleation and partial crystallization thereof to form a shaped glass-ceramic body, the glass-ceramic body referred to having an average lineal coefficient of thermal expansion of less than about $25 \times 10^{-7}/°$ C. and the glaze when fired having an average lineal coefficient of thermal expansion of about 3 to 4 times that of the glass-ceramic; and (B) subjecting the shaped crystallizable glass structure with its applied decorative glaze thereon to controlled temperature conditions that concurrently effect maturity of the applied glaze and partial crystallization of the crystallizable glass structure thereby to obtain a decorated shaped glass-ceramic structure.

16. The method as in claim 15 wherein the shaped structure is cookware.

17. The method as in claim 15 wherein the controlled temperature conditions to which reference is made in the last-specified step in the method are temperatures within the range of from about 1000° F. to a maximum of about 2000° F.

18. The method as in claim 17 wherein the temperatures are within the range of 1100° F. to 1950° F.

References Cited

UNITED STATES PATENTS

| | | | |
|---|---|---|---|
| 2,832,695 | 4/1958 | Compton et al. | 117—125 XR |
| 3,055,762 | 9/1962 | Hoffman | 117—124 XR |
| 3,220,870 | 11/1965 | Loehrke. | |
| 3,268,315 | 8/1966 | Stookey | 65—62 XR |

FOREIGN PATENTS 219,667  11/1957  Australia.

ALFRED L. LEAVITT, *Primary Examiner.*

W. F. CYRON, *Assistant Examiner.*

U.S. Cl. X.R.

117—125, 169